Oct. 16, 1956   H. M. SUCK   2,766,675
ROTARY CULTIVATOR
Filed Nov. 15, 1954   2 Sheets-Sheet 1
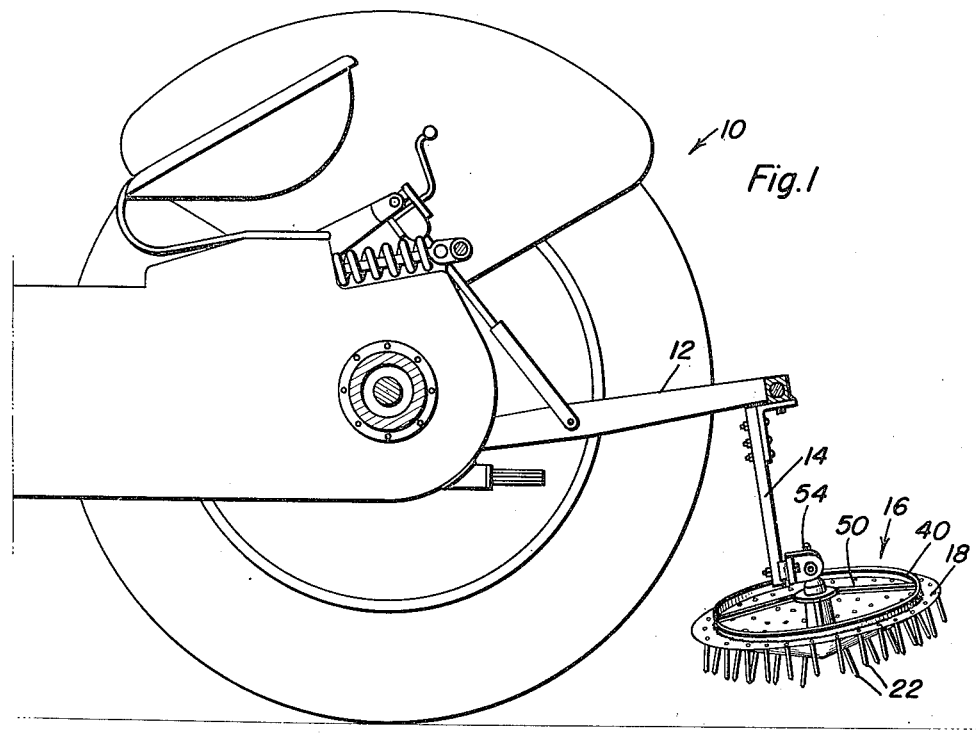
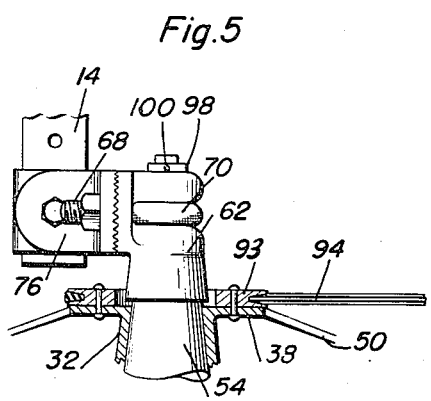
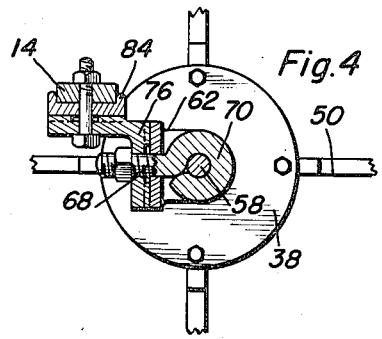
Harvey M. Suck
INVENTOR.

Oct. 16, 1956  H. M. SUCK  2,766,675
ROTARY CULTIVATOR
Filed Nov. 15, 1954  2 Sheets-Sheet 2
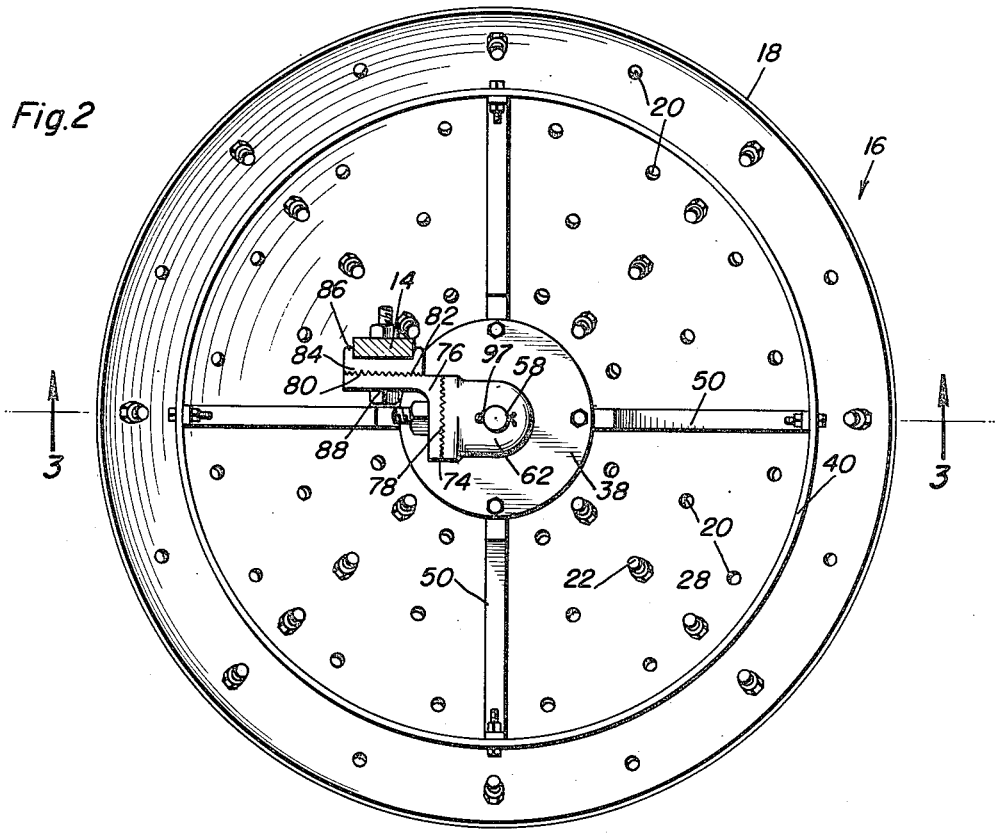
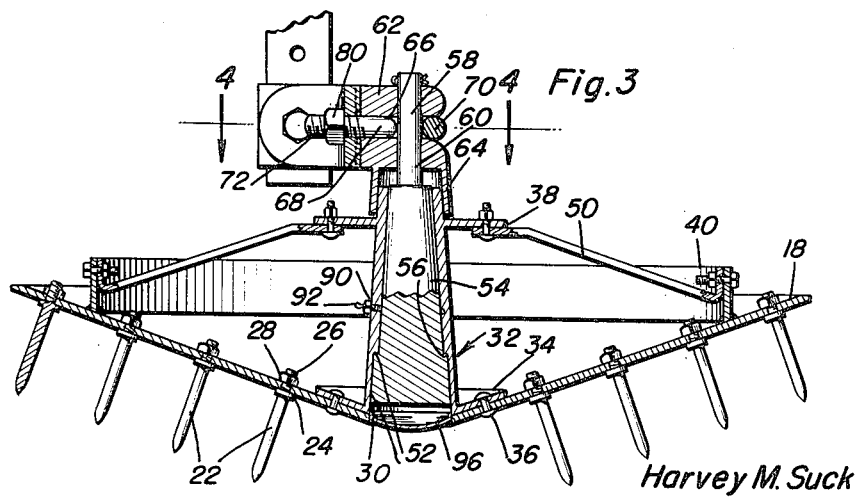
Harvey M. Suck
INVENTOR.

United States Patent Office 2,766,675
Patented Oct. 16, 1956

2,766,675
ROTARY CULTIVATOR
Harvey M. Suck, Grand Island, Nebr.
Application November 15, 1954, Serial No. 468,668
1 Claim. (Cl. 97—212)

The present invention relates to farm implements and more particularly relates to a rotary cultivator.

The primary object of the invention is in the provision of a novel rotary cultivator construction wherein the cultivator or harrow comprises a cone-shaped disk having cultivating teeth projecting therefrom which will operate to simultaneously aerate and mulch the soil while destroying weeds and centrifuging loose soil toward and against the growing crop plants.

A further object of the invention is in the provision of a novel rotary disk harrow construction which is self-cleaning and which is provided with a novel rotary mounting.

It is still a further object of the invention to provide a rotary disk harrow for cultivating between plant drop rows which necessitates no shields to guard the soil, the action of the cultivator itself controlling the movement of the soil and depositing loose soil in and around the plants of the plant rows.

A further feature of the invention resides in the provision of a novel journal bearing assembly for a cone-shaped disk wherein the apex of the cone is provided with a central aperture and an upwardly extending, tapered hub receiving a tapered bearing spindle, the hub and spindle being provided with cooperating shoulders to provide a lubricating seal between the spindle and the hub whereby lubricant can be maintained between the spindle and the hub for long periods of time to enable the substantially free rotation of the harrow.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the rotary disk harrow constituting the present invention mounted on a tool bar suspended from a tractor lift assembly;

Figure 2 is a top view of the rotary disk harrow constituting the invention;

Figure 3 is a vertical cross sectional view taken through the harrow substantially along the plane of section line 3—3 of Figure 2 with portions broken away for clarity;

Figure 4 is a horizontal cross-section through the bracket mounting assembly for the harrow taken substantially along the plane of section line 4—4 of Figure 3; and Figure 5 is a detail view of a portion of the mounting assembly for the harrow whereby the harrow may be power driven in its rotation.

Referring now to the drawings in detail, there is shown in Figure 1 the tractor 10 having a lift assembly 12 at the rear thereof and a tool bar 14 suspended from the lift assembly 12. To the lower end of the tool bar 14 is attached the rotary disk harrow assembly 16 constituting the invention.

Noting particularly Figures 2 and 3, the construction of the rotary harrow assembly 16 will be readily apparent.

The assembly 16 comprises essentially a cone-shaped disk 18 having a plurality of apertures 20 arranged in spaced concentric circular patterns between the apex and the periphery of the disk. As will be noted, these apertures are not necessarily radially aligned but may be in any varied staggered relationship.

Mounted in selected of these apertures depending upon the utility to which the rotary harrow is to be put are a plurality of elongated cultivating teeth 22. As will be noted, these cultivating teeth are simply in the form of elongated tines having threaded upper end portions with a washer 24 fixed adjacent the upper end of each tooth with the upper end portion of each tooth being threaded as at 26. These teeth 22 are mounted with the pointed tines thereof projecting below the disk and the washers 24 abutting the surface of the disk with the threaded end portions 26 extending through the disk. Nuts 28 threaded onto the upper end portions 26 of the teeth 22 abut the inner surface of the disk to retain the teeth in their selected apertures while yet permitting ready release of the teeth for different desirable arrangements.

The disk 18 is provided at its apex with an enlarged central opening 30 and to the inner surface of the disk in surrounding relation to the enlarged central aperture 30 is mounted an upwardly extending tapered hub 32. To mount the hub, the same is provided with a lower end flange 34 suitably riveted as at 36 to the disk 18 around the periphery of the central aperture 30 thereof.

Intermediate its ends and closely adjacent the upper end thereof, the hub 32 is provided with a fixed, annular ring or disk 38.

Rigidly fixed at one edge thereof to and arising from the inner surface of the disk adjacent the peripheral edge thereof is an annular flat band rim 40 and spokes 50 are attached at their opposite ends to the rim 40 and to the peripheral ring 38 on the hub 32 to stiffen the disk.

The bore of the spindle 32 is tapered with the lower end of the hub bore being enlarged in forming a shoulder juncture as at 52 on the inner wall surface thereof at the juncture of the enlarged lower end portion of the bore with the balance of the bore of the hub.

Journaled within the hub 32 is a spindle bearing 54 which is tapered upwardly in accordance with the taper of the bore of the hub 32, the lower end portion of the spindle bearing 54 being shouldered as at 56 and enlarged to fit within the enlarged portion of the bore of the hub and to seat against the shoulder 52 on the inner wall surface of the hub bore.

The spindle bearing 54 projects upwardly through the hub 32, the upper end portion of the spindle bearing 54 being formed as a cylindrical extension 58.

This upper end portion 58 of the spindle bearing 54 extends through a vertical bore 60 in a combination shield collar and toothed bracket 62. The undersurface of the shield collar and toothed bracket is provided with a downwardly extending sleeve 64 which journals over the extreme upper end portion of the hub 32 spaced slightly above the ring 38 formed on this hub.

The combination shield collar, the sleeve 64 forming the shield, includes at 66 a transverse slot portion terminating in an aperture portion through which extends an eyebolt 68, the eye 70 of the bolt surrounding the cylindrical portion 58 of the spindle bearing 54, the opposite threaded end 72 of the eyebolt extending outwardly beyond one of the side faces of the bracket. The side face of the bracket beyond which the threaded end 72 of the eyebolt 68 extends is formed as a serrated disk designated by the numeral 74.

An L-shaped bracket 76 having a pair of right angularly related serrated faces 78 and 80 respectively interconnect the combination shield collar and bracket 62 with the tool bar 14.

Both legs of the L-shaped bracket 76 are provided with central apertures, the serrated face 78 of this L-shaped bracket 76 being disposed in abutment with the serrated face 74 of the bracket 62 and being clamped thereagainst by virtue of the nut 80 threaded onto the threaded end of the eyebolt 68.

The serrated face 80 of the L-shaped bracket 76 abuts the serrated face 82 of an adapter bracket 84 the opposite face of which is provided with channel flanges 86 which embrace the opposite side edges of the tool bar 14. Fastener 88 extending through the leg of the bracket 76 upon which the serrations 80 are formed and the adapter bracket 84 as well as the tool bar 14 clamp the rotary disk harrow 18 to the tool bar.

In the ordinary operation of the device, the harrow is disposed in the manner shown in Figure 1 adjacent the soil in slightly tilted relation whereby as the harrow is drawn over the ground by the drawing vehicle, in this case the tractor 10, those teeth concentrically spaced radially outwardly from the apex toward the periphery of the cone-shaped disk 18 will progressively agitate the soil in different degrees which working in the soil both aerates and mulches the soil while at the same time the centrifugal motion will swirl loose soil toward and against the growing crop plants in the crop rows. Also by virtue of the centrifugal motion of the harrow, the same is self-cleaning since the centrifugal force will throw out any trash which momentarily may tend to clog the teeth.

The particular construction of the hub 32 and spindle bearing 54 noted previously in this description along with the combination shield bracket 62 provide a means for economically sealing lubricant between the inner wall surface of the hub and the spindle bearing 54.

To this effect, the hub 32 on an intermediate portion thereof above the shoulder 52 is provided with a lubricating aperature 90 normally closed by a lubricating plug 92. By providing lubricant through this aperture to the frictional surfaces of the hub 32 of the spindle bearings 54, the cooperating shoulders 52 and 56 of the hub and spindle respectively prevent the leakage of the lubricant through the bottom of the disk while the shield 64 of the shield bracket 62 protects the upper portion of the hub and spindle connection from the ingress of dirt and dust and the like thereby providing in essence an economical, sealed lubricating chamber for the harrow.

In many instances it may be desirable to positively drive the disk 18 and to this effect, the construction shown in Figure 5 is utilized wherein a sheave or pulley 93 is rivoted to or otherwise fixedly attached to the ring 38 on the hub 32 and a suitable V-belt pulley 94 or the like entrained thereover and connected to a suitable pulley on the power take-off of a tractor or the like (not shown).

In either event, whether power driven or not, by virtue of the attachment described, the harrow may be attached onto a conventional row crop cultivator in place of cultivating shovels.

For convenience, a hub stop and grease retainer 96 is provided in the form of a concave shaped disk which forms a press fit in the aperture 30 of the disk 18.

To retain the spindle bearing 54 in place, the upper end of the same is ordinarily provided with a transverse bore therethrough receiving a cotter pin 97.

However, as shown in Figure 5, a collar or bushing 98 is shown received over the upper end of the spindle and fixed thereto by means of setscrew 100, as an alternative fastening means in place of a cotter pin.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be restored to, falling within the scope of the appended claim.

What is claimed as new is as follows:

A rotary cultivator comprising a disk of inverted cone shape having depending cultivator teeth, an upwardly tapering hub on said disk fixed thereto and rising above the same, an upwardly tapering spindle in said hub supporting the same, means suspending said spindle and attachable to the tool bar of a tractor, an annular flat band rim in said disk rigidly fixed at one edg thereof to and rising from the inner surface of the disk concentrically thereof and adjacent the peripheral edge of the disk, an annular flat member fixed on the hub above the rim and disk, and spokes inclining downwardly from said member to said rim, said rim, member and spokes forming bracing means between said disk and hub.

References Cited in the file of this patent

UNITED STATES PATENTS

| | | |
|---|---|---|
| 248,636 | Carter | Oct. 25, 1881 |
| 770,351 | Carter | Sept. 20, 1904 |
| 1,207,579 | Lowry | Dec. 5, 1916 |
| 2,215,364 | Simmons et al. | Sept. 17, 1940 |
| 2,308,575 | Vickery | Jan. 19, 1943 |
| 2,651,246 | Peters et al. | Sept. 8, 1953 |
| 2,699,023 | Caldwell | Jan. 11, 1955 |

FOREIGN PATENTS

| | | |
|---|---|---|
| 549,676 | France | Nov. 27, 1922 |